March 21, 1950     L. C. BECKER     2,501,593
FLOW BEAN
Filed Feb. 1, 1947
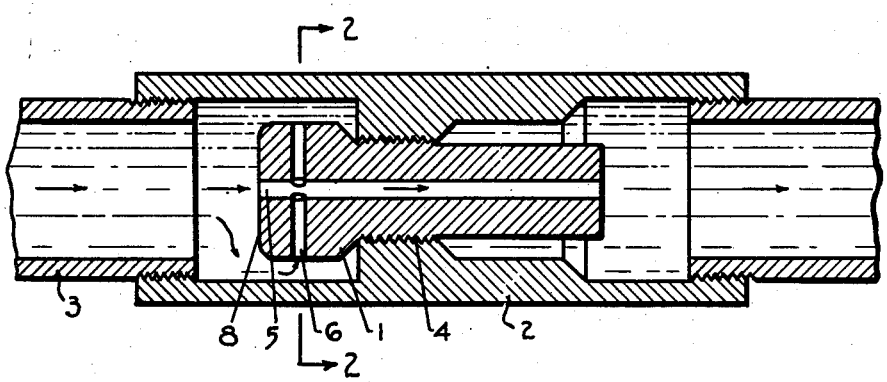
Fig. 1
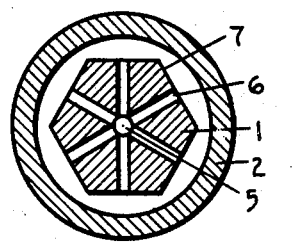
Fig. 2
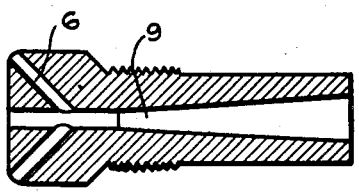     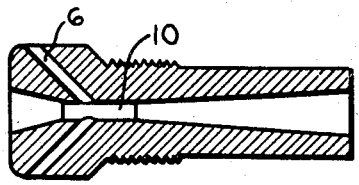
Fig. 3           Fig. 4
Inventor: Lawrence C. Becker
By his Attorney:

Patented Mar. 21, 1950

2,501,593

UNITED STATES PATENT OFFICE 2,501,593

FLOW BEAN

Lawrence C. Becker, Houma, La., assignor to Shell Development Company, San Francisco, Calif., a corporation of Delaware Application February 1, 1947, Serial No. 725,811

2 Claims. (Cl. 138—44)

This invention relates to a device for regulating the flow of liquids in pipes and pertains more particularly to a class of controlling devices known as flow beans or flow nipples.

Flow beans are commonly used to regulate liquid flow in various installations where the physical or chemical composition of fluids, and/or finely comminuted particles carried by such fluids, tend to corrode or abrade orifice walls to such an extent that it is necessary to replace the controlling device frequently. Such flow beans are often used in casinghead structures and pipe lines leading from oil wells which are flowing under considerable pressure.

The present invention relates particularly to a flow bean of the non-adjustable type. A flow bean of this type is described, for example, in U. S. Letters Patent No. 1,890,536 to Flanders.

A flow bean of this type acts in some respects like a controlling valve but unlike a valve it does not shut off the flow of liquid completely; it merely restricts or regulates the fluid flow. Whenever it is desirable to change the rate of fluid flow, because of changing conditions of the well, etc., a new bean of a different size is installed. It is also frequently necessary to change or clean a flow bean when the orifice becomes worn out or plugged. Particles of sand, cement, rubber or other materials are entrained in the flow stream from oil wells. These particles often cause a partial or total stoppage of the flow bean orifice. It is therefore the object of this invention to provide a flow bean of such a design as to eliminate the blocking of the flow passage through the bean by such particles.

Further objects of the invention will be readily understood from the following description of the accompanying drawing, in which:

Fig. 1 is a view in cross section of one form of the flow bean of the present invention.

Fig. 2 is a view in cross section of the flow bean taken along the line 2—2 in Fig. 1.

Figures 3 and 4 are views in cross section of two other embodiments of the present invention.

Briefly, the flow bean of the present invention comprises a hard abrasive-resistant, metal plug body adapted to be positioned in an oil well flow line, said body having a central flow-channel through the longitudinal axis of the plug, and one or more radial auxiliary channels or ports through the walls of the plug having a diameter not greater than the central flow-channel and connecting with said flow-channel, the auxiliary conduits being in communication with the fluid flow on the upstream side of the plug.

In the embodiment shown in Fig. 1, the flow bean 1 comprises a hard metal plug body having a flow-channel 5 of predetermined size formed through the longitudinal axis. Interchangeable flow beans of this type may be manufactured with flow-channel size variations of 1/64 of an inch in diameter. Liquid and gas passage from the well, as well as flowing pressures, are regulated by the size of this opening. The flow bean is centered and positioned removably in a section 2 of the discharge line 3 from the oil well head assembly. The bean may be attached to the pipe in any suitable manner such as by screw threads 4. Positive placement is obtained by applying a tightening pressure to the hexagonal head 7 of the flow bean 1.

This type of flow bean provides a simple, sturdy and inexpensive flow controlling device for oil containing such a highly abrasive material as sand. However, besides carrying sand particles, the flowing oil and gas from a well also entrain pieces of cement, rubber and other materials which tend to clog, partially or completely, the flow-channel 5 of the flow bean 1, necessitating the frequent cleaning or replacement of the bean.

It has now been found that the plugging, and the consequent necessity for removing and cleaning the flow bean is eliminated or greatly decreased by the addition, to the above-described flow bean, of auxiliary radial channels or ports 6 of a diameter size not greater than that of the central flow-channel 5 in communication between said flow channel 5 and the space outside the flow bean 1 on the upstream side of said bean. In the event that the upstream opening of the central flow-channel 5 becomes clogged with some foreign matter the auxiliary conduits 6 form other entrances to said main flow-channel 5. Also, particles of solid matter are not pulled against and into a number of channels as readily in the case of a single channel, since the pressure differential between the inner and outer openings of the channels is reduced from that when there is only one channel. The flow bean, shown in Fig. 2 by way of illustration, has six radial, auxiliary conduits drilled through the hexagonal head 7 of said flow bean and communicating with said central flow-channel 5, although any desired number of radial channels, including one, may be used. Thus, such a perforated head acts as a sort of a screen, having a plurality of openings instead of one that must become clogged before it is necessary to remove the bean.

The radial direction in which the auxiliary channels are arranged, which is at right angles to the main line of flow of the oil, gas and sand, is also believed to be instrumental in minimizing the clogging of said auxiliary channels. The term "radial channels," as used in the present invention to describe the auxiliary channels or port means through the wall of the flow bean, includes all channels which radiate from the central flow-channel through the longitudinal axis of the bean so as to be in communication between said central flow-channel and the space outside the bean. These radial auxiliary channels may be formed in the flow bean at directions other than perpendicular to the longitudinal axis of said bean, as shown in Figs. 3 and 4.

Although the present flow bean is described as a metal plug having a hole drilled through its longitudinal axis, it may also be a nipple, tube or section of pipe with an axial bore of a predetermined size and preferably having thick walls. Since these flow beans are subjected to the constant abrasive action of sand they are usually made of a very hard metal or have the face 8 of the upstream end of the bean coated with a hard metal, such as tungsten carbide. This invention is not necessarily confined to flow beans having a flow-channel of constant diameter throughout but may be readily applied to a bean with a flow-channel 9 tapering toward the upstream end, as shown in Fig. 3, or to a bean having a flow-channel 10 tapering in both directions provided the auxiliary conduits 6 are in communication at or on the downstream side of the most restricted portion of said central flow-channel, as shown in Fig. 4.

I claim as my invention:

1. For use in a well flow line having a transverse baffle member with a threaded orifice therein, a flow bean comprising a tubular member having a small diameter axial bore therethrough and a head of relatively enlarged outside diameter, said tubular member being externally threaded adjacent said head, whereby said tubular member can be mounted in said flow line by engaging the threaded portion thereof with the threaded orifice of said transverse baffle member, said head being on the upstream side of the flow line and in abutment with said baffle member, and a plurality of radial channels through the walls of said head in communication between the space upstream of said baffle member and the axial bore of said tubular member.

2. The device of claim 1, wherein the radial passages through the head are formed at an angle to the axial line of the bore through the tubular member.

LAWRENCE C. BECKER.

REFERENCES CITED

The following references are of record in the file of this patent:

UNITED STATES PATENTS

| Number | Name | Date |
| --- | --- | --- |
| 1,627,161 | Edwards | May 3, 1927 |
| 2,094,222 | Smith | Sept. 28, 1937 |
| 2,277,760 | Hoffman et al. | Mar. 31, 1942 |
| 2,294,499 | Henkell et al. | Sept. 1, 1942 |